United States Patent
Du et al.

(10) Patent No.: US 9,612,697 B2
(45) Date of Patent: Apr. 4, 2017

(54) TOUCH CONTROL METHOD OF CAPACITIVE AND ELECTROMAGNETIC DUAL-MODE TOUCH SCREEN AND HANDHELD ELECTRONIC DEVICE

(71) Applicant: BEIJING ERENEBEN INFORMATION TECHNOLOGY CO., LTD., Tongzhou District, Beijing (CN)

(72) Inventors: Guoying Du, Beijing (CN); Jia Zhou, Beijing (CN)

(73) Assignee: BEIJING ERENEBEN INFORMATION TECHNOLOGY CO., LTD., Beijing (CN)

( * ) Notice: Subject to any disclaimer, the term of this patent is extended or adjusted under 35 U.S.C. 154(b) by 67 days.

(21) Appl. No.: 14/423,643

(22) PCT Filed: Nov. 26, 2012

(86) PCT No.: PCT/CN2012/085270
§ 371 (c)(1),
(2) Date: Feb. 24, 2015

(87) PCT Pub. No.: WO2014/029170
PCT Pub. Date: Feb. 27, 2014

(65) Prior Publication Data
US 2015/0261346 A1    Sep. 17, 2015

(30) Foreign Application Priority Data

Aug. 24, 2012   (CN) .......................... 2012 1 0306754

(51) Int. Cl.
G06F 3/045       (2006.01)
G06F 3/044       (2006.01)
(Continued)

(52) U.S. Cl.
CPC .............. G06F 3/044 (2013.01); G06F 3/046 (2013.01); G06F 3/0416 (2013.01); G06F 2203/04106 (2013.01)

(58) Field of Classification Search
CPC ......... G06F 2203/04106; G06F 3/0416; G06F 3/044; G06F 3/046
See application file for complete search history.

(56) References Cited

U.S. PATENT DOCUMENTS

2010/0238121 A1* 9/2010 Ely ......................... G06F 3/044
345/173
2012/0092577 A1* 4/2012 Shi ...................... G02F 1/13338
349/43

FOREIGN PATENT DOCUMENTS

CN        101739165 A      6/2010
CN        202003335 U     10/2011
(Continued)

Primary Examiner — Kumar Patel
Assistant Examiner — Insa Sadio
(74) Attorney, Agent, or Firm — Dilworth IP, LLC

(57) ABSTRACT

A touch control method of a capacitive and electromagnetic dual-mode touch screen and handheld electronic device are disclosed. The method includes receiving a touch instruction generated on the touch screen; judging whether the touch instruction is a capacitive induction instruction or an electromagnetic induction instruction; processing the touch instruction according to a handwriting input mode if the touch instruction is a capacitive induction instruction, or processing the touch instruction according to a touch control mode if the touch instruction is an electromagnetic induction instruction. By the above method, the invention can fulfill the demand for presenting original handwriting by a user, as well as the requirement for a simple and convenient operation.

18 Claims, 12 Drawing Sheets

(51) Int. Cl.
*G06F 3/046* (2006.01)
*G06F 3/041* (2006.01)

(56) References Cited

FOREIGN PATENT DOCUMENTS

| | | |
|---|---|---|
| CN | 202472600 U | 10/2012 |
| JP | 2011186550 A | 9/2011 |

\* cited by examiner

TOUCH CONTROL METHOD OF CAPACITIVE AND ELECTROMAGNETIC DUAL-MODE TOUCH SCREEN AND HANDHELD ELECTRONIC DEVICE

TECHNICAL FIELD

The present disclosure relates to a touch method of a capacitive and electromagnetic dual-mode touch screen and a handheld electronic device.

TECHNICAL BACKGROUND

Currently, a touch screen inputting mode employed by a handheld electronic device is generally an electromagnetic touch inputting mode or a capacitive touch inputting mode.

With the electromagnetic touch inputting mode, a high positioning accuracy may be achieved and both inclination angles and pressure information of an electromagnetic pen can be obtained to facilitate handwriting, hand drawing and the like in an original handwriting trace, where the electromagnetic pen is necessary. However, the electromagnetic pen must be also used by the user in performing operations other than handwriting and hand drawing, thereby resulting in inconvenience in use. Also, the capacitive touch inputting mode, which is based on finger touching inputs, is convenient and flexible and can overcome defects existing in the electromagnetic touch inputting mode, but cannot intuitively reflect information such as pressure of a finger touch, thereby resulting in low positioning accuracy, and thus original handwriting traces cannot be realistically simulated when the user attempts to implements the original handwriting inputting. Moreover, the capacitive touch inputting mode is not suitable for drawing functions with high positioning accuracy requirements due to its low positioning accuracy.

Various kinds of office application software, such as a notebook, have been adaptively designed for the above handheld electronic device in the related art. However, such office application software can only support one certain inputting mode, causing a certain constraint. For example, an electronic device with the electromagnetic touch inputting mode can perform operations such as page turning only by using an electromagnetic pen or a physical key, but in actual operations, performing all operations using the electromagnetic pen does not conform with common habits, such as page turning with a hand, of a user. For an electronic device with the capacitive touch inputting mode, merely a rough handwriting trace can be presented because of the low positioning accuracy of the capacitive touch inputting, that is, an original handwriting effect such as stylized traces and handwriting pausing points (e.g., a first or last point of a stroke) cannot be achieved, so that presentation of the original handwriting trace cannot be satisfied by the user, and hence the application such as signing and hand painting cannot be satisfied in the capacitive touch inputting mode.

SUMMARY

A technical problem to be mainly solved by the present disclosure is to provide a touch method of a capacitive and electromagnetic dual-mode touch screen and a handheld electronic device, which can meet user requirements for presenting original handwriting traces, and meet requirements for simple and convenient operations.

To solve the above technical problem, a technical solution applied by the present disclosure is to provide a touch method of a capacitive and electromagnetic dual-mode touch screen, including: receiving a handwriting application entering instruction generated by touching a handwriting application widget displayed in the touch screen, where the handwriting application integrates all sub-applications having handwriting functions; launching the handwriting application according to the handwriting application entering instruction, and displaying at least two sub-application widgets having handwriting functions in the touch screen; receiving a sub-application entering instruction generated by touching one of the at least two sub-application widgets; launching a sub-application according to the sub-application entering instruction, and displaying a first area and a second area corresponding to the sub-application in the touch screen, where the first area is at least configured for implementing a handwriting input, and the second area is configured for implementing a control; receiving a touch instruction generated on the touch screen; obtaining touch point coordinates of the touch instruction on the touch screen; determining whether the touch point coordinates of the touch instruction on the touch screen are located within the first area or the second area; and determining whether the touch instruction is a capacitive induction instruction or an electromagnetic induction instruction if it is determined that the touch point coordinates are located within the first area; processing the touch instruction according to a handwriting input mode if the touch instruction is an electromagnetic induction instruction, or else processing the touch instruction according to a touch control mode if the touch instruction is a capacitive induction instruction; and processing the touch instruction according to the touch control mode if it is determined that the touch point coordinates are located within the second area.

The processing the touch instruction according to a handwriting input mode includes: converting the touch instruction into a handwriting trace displayed in the first area according to the handwriting input mode, and recording the handwriting trace.

To solve the above technical problem, another technical solution applied by the present disclosure is to provide a touch method of a capacitive and electromagnetic dual-mode touch screen, including: receiving a touch instruction generated on the touch screen; determining whether the touch instruction is a capacitive induction instruction or an electromagnetic induction instruction; and processing the touch instruction according to a handwriting input mode if the touch instruction is an electromagnetic induction instruction, else processing the touch instruction according to a touch control mode if the touch instruction is a capacitive induction instruction.

After a touch instruction generated on the touch screen, including: obtaining touch point coordinates of the touch instruction on the touch screen; and determining whether the touch point coordinates of the touch instruction on the touch screen are located within a first area or a second area, wherein the first area is at least configured for implementing a handwriting input, and the second area is configured for implementing a control; and entering a step of the determining whether the touch instruction is a capacitive induction instruction or an electromagnetic induction instruction if it is determined that the touch point coordinates are located within the first area.

After determining whether the touch point coordinates of the touch instruction on the touch screen are located within a first area or a second area, further including: processing the touch instruction according to the touch control mode if it is determined that the touch point coordinates are located within the second area.

The processing the touch instruction according to a handwriting input mode includes: converting the touch instruction into a handwriting trace displayed in the first area according to the handwriting input mode, and recording the handwriting trace.

The processing the touch instruction according to a touch control mode if the touch instruction is a capacitive induction instruction includes: displaying a widget in the first area and triggering the function of the touch instruction corresponding to the widget according to the touch control mode; or, directly triggering the function of the touch instruction without displaying a widget in the first area according to the touch control mode; or, neither displaying a widget in the first area nor triggering any functions according to the touch control mode, if the touch instruction is a capacitive induction instruction.

The processing the touch instruction according to the touch control mode if it is determined that the touch point coordinates are located within the second area: using the capacitive induction instruction or the electromagnetic induction instruction as a control instruction to trigger the function of the control instruction corresponding to the widget which is displayed in the second area, according to the touch control mode, if it is determined that the touch point coordinates are located within the second area.

Before receiving a touch instruction generated on the touch screen, including: receiving a handwriting application entering instruction generated by touching a handwriting application widget displayed in the touch screen, wherein the handwriting application integrates all sub-applications having handwriting functions; launching a handwriting application according to the handwriting application entering instruction, and displaying at least two sub-application widgets having handwriting functions in the touch screen; receiving a sub-application entering instruction generated by touching one of the at least two sub-application widgets; and launching a sub-application according to the sub-application entering instruction, and displaying a first area and a second area corresponding to the sub-application in the touch screen.

After launching a sub-application according to the sub-application entering instruction, including: receiving a file creating instruction or a file importing instruction correspondingly generated by touching a file creating widget or a file importing widget of a sub-application displayed in the touch screen; and creating a new file according to the file creating instruction and opening the new file, and displaying a first area and a second area corresponding to the new file in the touch screen; or importing a selected existing file according to the file importing instruction and opening the existing file, and displaying a first area and a second area corresponding to the existing file in the touch screen.

The launching a sub-application according to the sub-application entering instruction and displaying a first area and a second area corresponding to the sub-application in the touch screen, includes: launching a sub-application according to the sub-application entering instruction, and displaying a first area, a second area and at least another sub-application widget corresponding to the sub-application in the touch screen; and after launching a sub-application according to the sub-application entering instruction and displaying a first area and a second area corresponding to the sub-application in the touch screen, including: receiving another sub-application entering instruction generated by touching the another sub-application widget; and launching the another sub-application according to the another sub-application entering instruction, and displaying a first area and a second area corresponding to the another sub-application in the touch screen.

Before receiving a touch instruction generated on the touch screen, including: receiving a sense instruction generated when suspending above the touch screen; determining whether the sense instruction is an electromagnetic induction instruction or a capacitive induction instruction; determining whether time duration of the received sense instruction is greater than or equal to a time threshold value if the sense instruction is an electromagnetic induction instruction; and launching an annotation mode if the duration time is greater than or equal to the time threshold value.

A screen is captured, and the touch instruction is processed in the captured screen according to the handwriting input mode so as to perform annotation, if it is determined that the touch instruction is an electromagnetic induction instruction in the step of determining whether the touch instruction is a capacitive induction instruction or an electromagnetic induction instruction.

To solve the above technical problem, another technical solution applied by the present disclosure is to provide a handheld electronic device having a capacitive and electromagnetic dual-mode touch screen, including: an instruction obtaining module configured for receiving a touch instruction generated on the touch screen; an instruction type determining module configured for determining whether the touch instruction is a capacitive induction instruction or an electromagnetic induction instruction; and an instruction processing module configured for processing the touch instruction according to a handwriting input mode when the instruction type determining module determines that the touch instruction is an electromagnetic induction instruction, and processing the touch instruction according to a touch control mode when the instruction type determining module determines that the touch instruction is a capacitive induction instruction.

The instruction obtaining module is further configured for obtaining touch point coordinates of the touch instruction on the touch screen; the handheld electronic device includes a touch point area determining module, which is configured for determining whether the touch point coordinates of the touch instruction generated on the touch screen and received by the instruction obtaining module are located within a first area or a second area, wherein the first area is at least configured for implementing a handwriting input, and the second area is configured for implementing a control; and the instruction type determining module performs the operation of determining whether the touch instruction is a capacitive induction instruction or an electromagnetic induction instruction if the touch point area determining module determines that the touch point coordinates are located within the first area.

The instruction processing module is further configured for processing the touch instruction according to the touch control mode if it is determined that the touch point coordinates are located within the second area.

The instruction processing module includes a handwriting input mode processing unit, which is configured for processing the touch instruction according to the handwriting input mode if the instruction type determining module determines that the touch instruction is an electromagnetic induction instruction, wherein processing the touch instruction according to the handwriting input mode includes:

converting the touch instruction into a handwriting trace displayed in the first area and recording the handwriting trace.

The instruction processing module includes a touch control mode processing unit, which is configured for processing the touch instruction according to the touch control mode if the instruction type determining module determines that the touch instruction is a capacitive induction instruction, wherein processing the touch instruction according to the touch control mode includes: displaying a widget in the first area and triggering functions of the touch instruction corresponding to the widget; or, directly triggering functions of the touch instruction without displaying a widget in the first area; or, neither displaying a widget in the first area nor triggering any functions.

The instruction processing module is further configured for using the capacitive induction instruction or the electromagnetic induction instruction as a control instruction to trigger the function of the control instruction corresponding to the widget which is displayed in the second area, according to the touch control mode, if it is determined that the touch point coordinates are located within the second area.

the handheld electronic device further includes an instruction pre-processing module, including: a first reception unit configured for receiving a handwriting application entering instruction generated by touching a handwriting application widget displayed in the touch screen, wherein the handwriting application integrates all sub-applications having handwriting functions; a first launch unit configured for launching the handwriting application according to the handwriting application entering instruction, and displaying at least two sub-application widgets having handwriting functions in the touch screen; a second reception unit configured for receiving a sub-application entering instruction generated by touching one of the at least two sub-application widgets; and a second launch unit configured for launching a sub-application according to the sub-application entering instruction, and displaying a first area and a second area corresponding to the sub-application in the touch screen.

The beneficial effect of the present disclosure lies in that: different from the situation in the related art, the touch method of the present disclosure determines whether the touch instruction is a capacitive induction instruction or an electromagnetic induction instruction. If the touch instruction is the electromagnetic induction instruction, the touch instruction is processed according to a handwriting input mode; and if the touch instruction is the capacitive induction instruction, the touch instruction is processed according to a touch control mode. Processing the touch instruction according to the handwriting input mode can meet user requirements for the presence of original handwriting trace, can achieve an original handwriting effect such as stylized traces and handwriting pausing points, and can meet application requirements such as signing and hand painting. Also, processing the touch instruction according to the touch control mode can better conform to the common habit, such as page turning with fingers, of a user, can meet requirements for simple and convenient operations, and can enhance user experiences.

DETAILED DESCRIPTION OF THE PREFERRED IMPLEMENTATION

The present disclosure is illustrated in detail below in combination with accompanying drawings and embodiments.

Firstly, operating principles of a capacitive touch screen and an electromagnetic touch screen are briefly introduced, respectively, as follows.

A capacitive touch screen achieves an object of touch sensing generally by inducing a weak current from a human body; and an electromagnetic touch screen achieves an object of touch sensing generally by electromagnetic induction, where an electromagnetic pen is used as an electromagnetism generating party and an electromagnetic plate is used as an electromagnetism inducing party, so that changes of a magnetic flux is sensed as the electromagnetic pen approaches the electromagnetic plate, thereby determining a touch point through calculation, in order to achieve the object of touch sensing.

The touch screen in the present disclosure is a dual-mode touch screen having both a capacitive touch screen function and an electromagnetic touch screen function. In the context of the present disclosure, a capacitive induction instruction generally refers to an instruction generated by touching the touch screen with a finger by a user, and an electromagnetic induction instruction generally refers to an instruction generated by touching the touch screen with an electromagnetic pen by a user.

Figure 1:
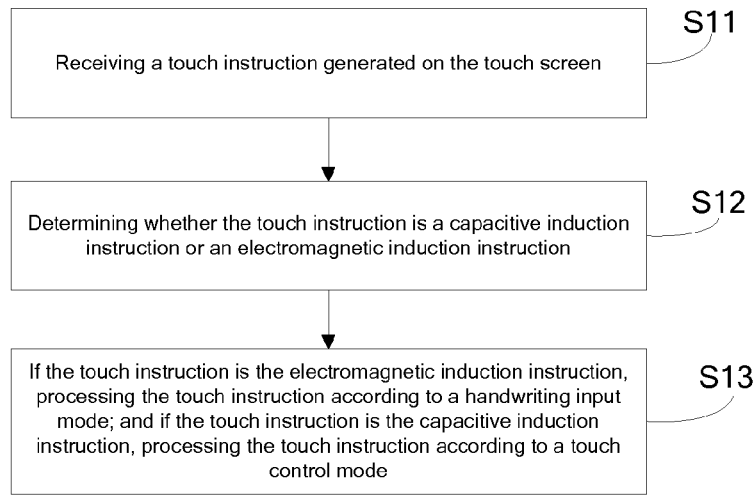
FIG. 1 is a flow chart of a first implementation of a touch method of a capacitive and electromagnetic dual-mode touch screen according to the present disclosure.

FIG. 1 is a flow chart of a first implementation of a touch method of a capacitive and electromagnetic dual-mode touch screen according to the present disclosure. In the first implementation of the present disclosure, the method includes Steps S11 to S13 below.

Step S11: receiving a touch instruction generated on the touch screen.

A corresponding touch instruction would be generated by the touch screen and then obtained by a system either the touch screen is touched by a finger or by an electromagnetic pen. Under operating principles of the dual-mode touch screen, a capacitive touch screen in the dual-mode touch screen can detect and obtain a capacitive touch instruction, and an electromagnetic touch screen in the dual-mode touch screen can detect and obtain an electromagnetic touch instruction. Therefore, the dual-mode touch screen can obtain both the capacitive touch instruction and the electromagnetic touch instruction. The dual-mode touch screen herein is not limited, and may be any touch screen capable of detecting touch instructions of any two modes. Moreover, the dual-mode touch screen herein is not limited to a structure with two separated touch screens, but may be of an integral touch screen capable of detecting touch instructions of any two modes.

Step S12: determining whether the touch instruction is a capacitive induction instruction or an electromagnetic induction instruction.

Step S13: if the touch instruction is the electromagnetic induction instruction, processing the touch instruction according to a handwriting input mode; and if the touch instruction is the capacitive induction instruction, processing the touch instruction according to a touch control mode.

In the context, the electromagnetic induction instruction is processed according to the handwriting input mode, in order to present a handwriting trace inputted by a user; and the capacitive induction instruction is processed according to the touch control mode, and specifically, different capacitive induction instructions respectively correspond to different control commands, so that the corresponding functions are triggered according to the different capacitive induction instructions.

In the implementation of the present disclosure, it is determined whether the touch instruction is a capacitive induction instruction or an electromagnetic induction instruction. If the touch instruction is the electromagnetic induction instruction, the touch instruction is processed according to a handwriting input mode; and if the touch instruction is the capacitive induction instruction, the touch instruction is processed according to a touch control mode. Processing the touch instruction according to the handwriting input mode can meet user requirements for the presence of original handwriting traces, can achieve an original handwriting effect such as stylized traces and handwriting pausing points (e.g. harsh strokes), and can meet application requirements such as signing and hand painting. Also, processing the touch instruction according to the touch control mode can better conform to the common habits, such as page turning with fingers, of a user, can meet requirements for simple and convenient operations, and can enhance user experiences.

Figure 2:
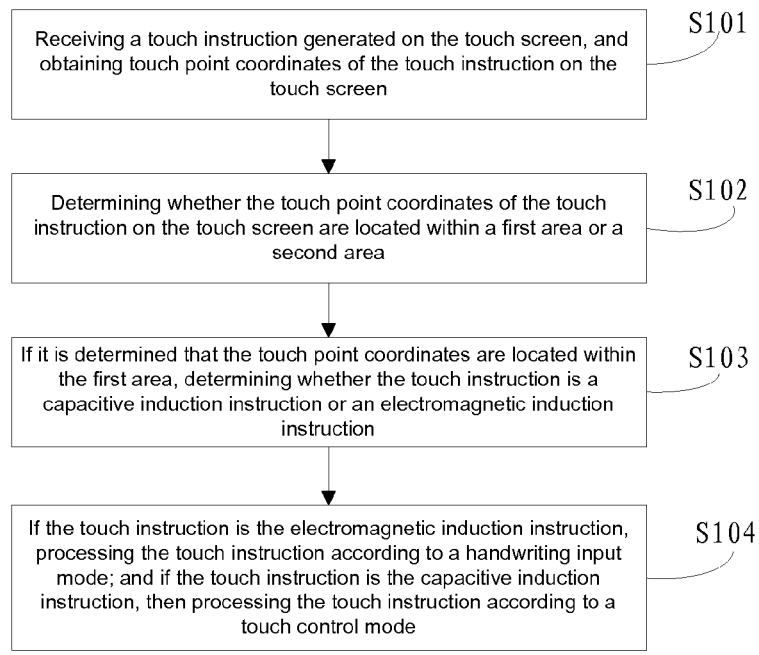
FIG. 2 is a flow chart of a second implementation of the touch method of the capacitive and electromagnetic dual-mode touch screen according to the present disclosure.

FIG. 2 is a flow chart of a second implementation of a touch method of a capacitive and electromagnetic dual-mode touch screen according to the present disclosure. In the second implementation of the present disclosure, the method includes Steps S101 to S104 below.

Step S101: receiving a touch instruction generated on the touch screen, and obtaining touch point coordinates of the touch instruction on the touch screen.

In the case that a touch on the touch screen is valid, the touch screen can generate a touch instruction, and the touch instruction is received and the touch point coordinates of the touch instruction on the touch screen are obtained, regardless of whether the touch screen is touched by a finger or by an electromagnetic pen.

Step S102: determining whether the touch point coordinates of the touch instruction on the touch screen are located within a first area or a second area. The first area is at least configured for implementing a handwriting input, and the second area is configured for implementing a control. It is noted that, the first area may be configured to have merely a handwriting input function; and alternatively, the first area may be configured to have both a handwriting input function and a handwriting control function as actually desired.

Figure 3:
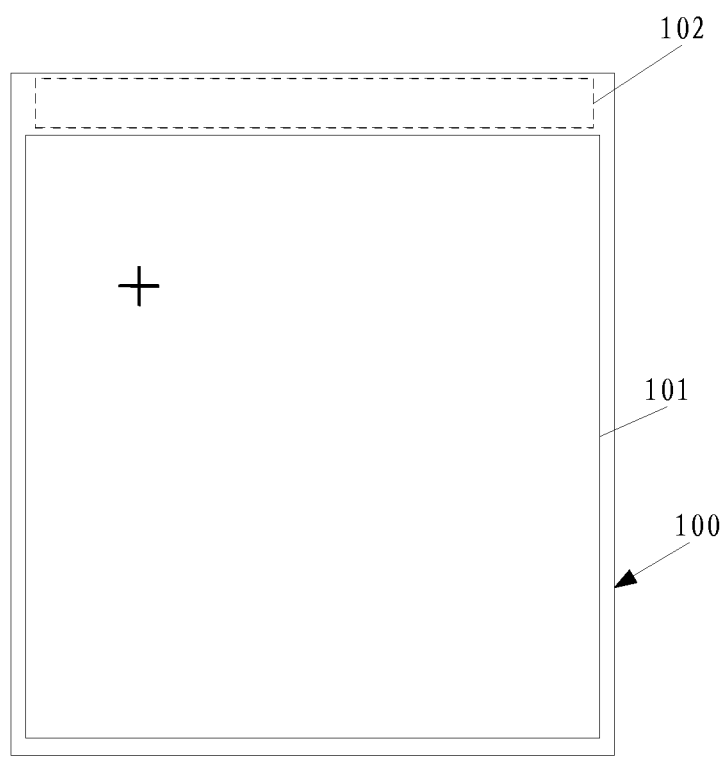
FIG. 3 is a schematic diagram showing the structure of an interface of an implementation of a first area and a second area in the second implementation of the touch method of the capacitive and electromagnetic dual-mode touch screen according to the present disclosure.

Generally, a division between the first area and the second area is made in a software interface design depending on requirements of the user, and other dividing manners may also be possible and are not specifically limited herein. For example, as shown in FIG. 3, in a sub-application, a touch screen 100 is divided into a first area 101 and a second area 102, where the first area 101 is at least configured for implementing a handwriting input, i.e. the first area 101 is mainly configured for implementing a handwriting input but may also be configured for implementing a control, and the second area 102 is merely configured for implementing a control. In FIG. 3, a symbol "+" represents a touch point of the touch instruction on the touch screen. It is necessarily determined in advance in Step S102 whether coordinates of a touch point (such as the "+" shown in FIG. 3) are located within the first area 101 or the second area 102, in order to perform the following steps.

Step S103: if it is determined that the touch point coordinates are located within the first area, determining whether the touch instruction is a capacitive induction instruction or an electromagnetic induction instruction.

Step S104: if the touch instruction is the electromagnetic induction instruction, processing the touch instruction according to a handwriting input mode; and if the touch instruction is the capacitive induction instruction, processing the touch instruction according to a touch control mode.

In the case that the touch point coordinates are located within the first area, if the touch instruction is an electromagnetic induction instruction, then the touch instruction is processed according to the handwriting input mode so as to eventually present the handwriting trace inputted by the user; and if the touch instruction is a capacitive induction instruction, then the touch instruction is processed according to the touch control mode, in response to control operations corresponding to the touch instruction, such as control operations of page turning, zooming and drag-and-drop.

In the implementation of the present disclosure, it is determined whether the touch point coordinates of the touch instruction on the touch screen are located within the first area or the second area. If the touch point coordinates are located within the first area, then it is determined whether the touch instruction is the capacitive induction instruction or the electromagnetic induction instruction. If the touch instruction is an electromagnetic induction instruction, then the touch instruction is processed in the handwriting input mode; and if the touch instruction is a capacitive induction instruction, then the touch instruction is processed in the touch control mode. Processing the touch instruction in the handwriting input mode can meet requirements of the user to present original handwriting. Moreover, processing the touch instruction in the touch control mode meets requirements of simple and convenient operations, and enhances user experiences.

Figure 4:
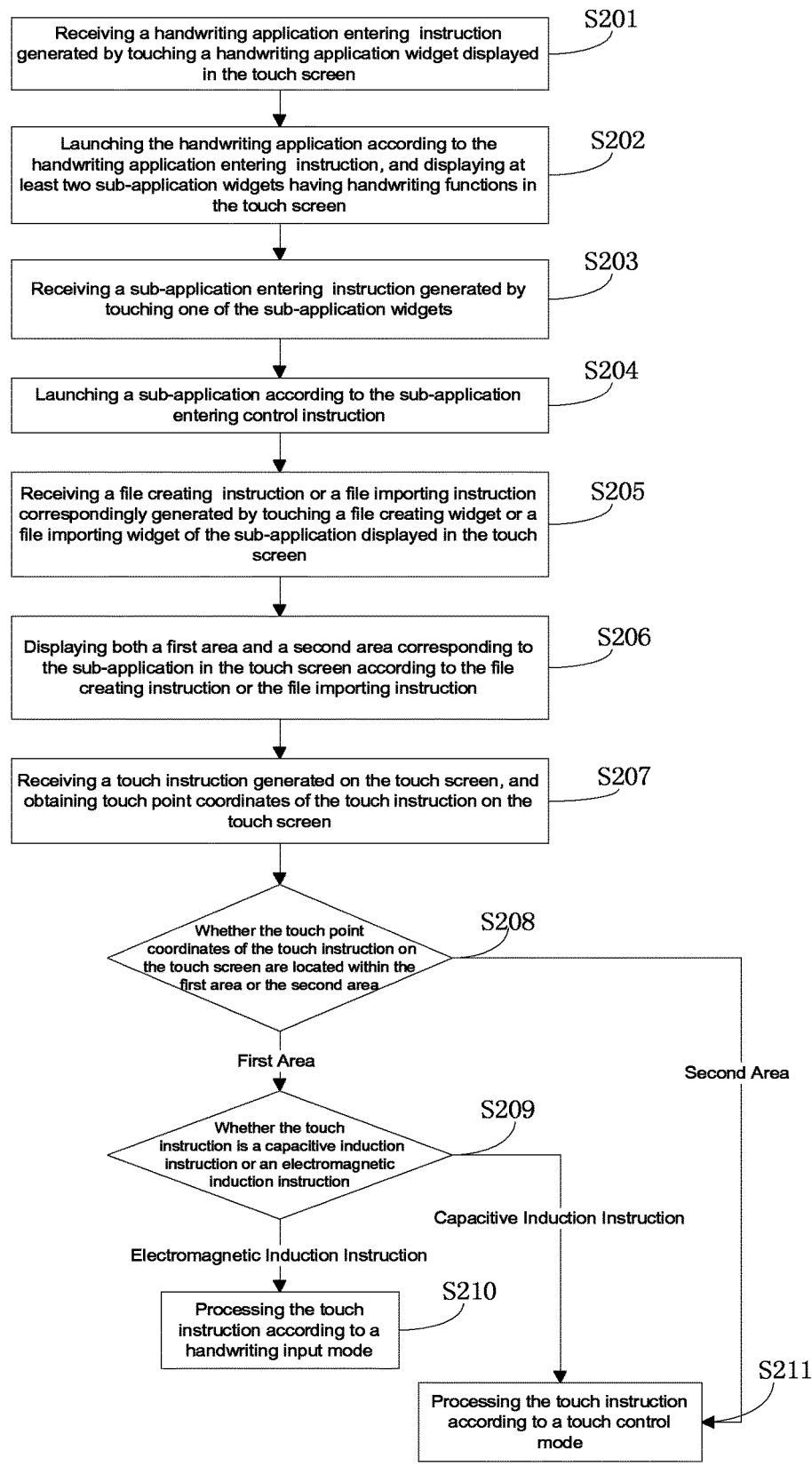
FIG. 4 is a flow chart of a third implementation of the touch method of the capacitive and electromagnetic dual-mode touch screen according to the present disclosure.

FIG. 4 is a flow chart of a third implementation of a touch method of a capacitive and electromagnetic dual-mode touch screen according to the present disclosure. In the third implementation of the present disclosure, the method includes Steps S201 to S211 below.

Figure 5:
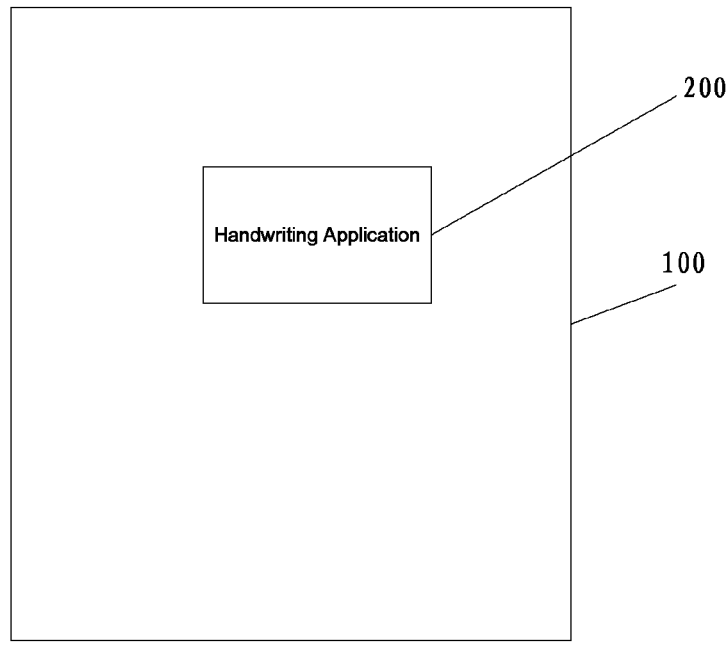
FIG. 5 is a schematic diagram showing the structure of an application interface of the third implementation of the touch method of capacitive and electromagnetic dual-mode touch screen according to the present disclosure.

Step S201: receiving a handwriting application entering instruction generated by touching a handwriting application widget displayed in the touch screen. The handwriting application integrates all sub-applications having handwriting functions. As shown in FIG. 5, a handwriting application 200 at the center of the touch screen 100 provides a unified entrance for a plurality of sub-applications performing the handwriting functions, so that the plurality of sub-applications are presented to the user after entering the handwriting application 200, and the user is allowed to select any one of the sub-applications as required.

Step S202: launching the handwriting application according to the handwriting application entering instruction, and displaying at least two sub-application widgets having handwriting functions in the touch screen.

Figure 6:
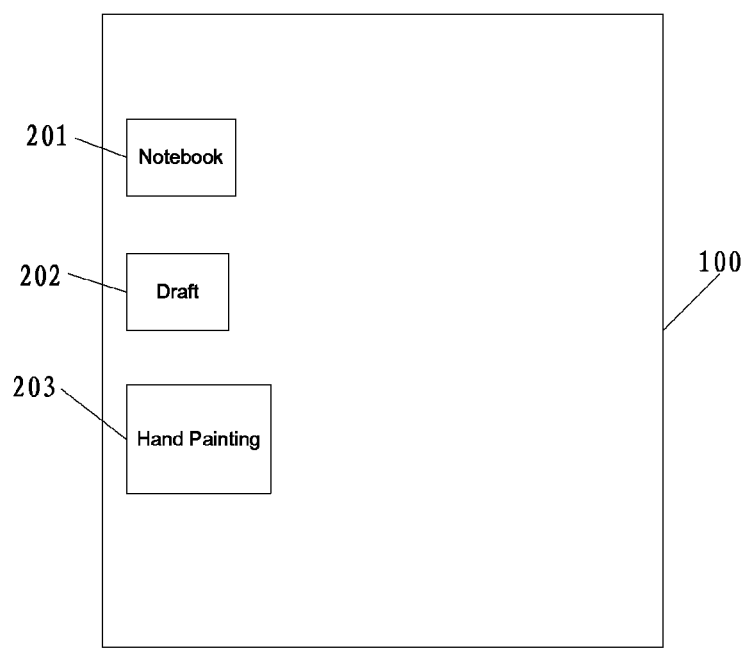
FIG. 6 is a schematic diagram showing the structure of another application interface of the third implementation of the touch method of the capacitive and electromagnetic dual-mode touch screen according to the present disclosure.

In conjunction with FIGS. 5 and 6, after the handwriting application 200 in FIG. 5 is clicked, an interface as shown in FIG. 6 is presented to display three sub-application widgets having handwriting functions, i.e. a notebook sub-application 201, a draft sub-application 202 and a hand painting sub-application 203. The specific design of the sub-application widgets is not limited by the amount and type of the sub-application widgets in the above example.

Step S203: receiving a sub-application entering instruction generated by touching one of the sub-application widgets.

Step S204: launching a sub-application according to the sub-application entering instruction.

Step S205: receiving a file creating instruction or a file importing instruction correspondingly generated by touching a file creating widget or a file importing widget of the sub-application displayed in the touch screen.

Step S206: displaying both a first area and a second area corresponding to the sub-application in the touch screen according to the file creating instruction or the file importing instruction.

Particularly, in Step S206, a new file is created and opened according to the file creating instruction, and both a first area and a second area corresponding to the new file are displayed in the touch screen; or a selected existing file is imported and opened according to the file importing instruction, and both a first area and a second area corresponding to the existing file are displayed in the touch screen.

The sub-application allows a file, which is of a type supported by the sub-application, to be imported from other storage locations, and the file imported into the sub-application is displayed by the touch screen. The file imported into the sub-application may be displayed as an icon or a name.

Step S206 may also be performed by:
a first sub-step of creating a new file according to the file creating instruction, or importing the selected existing file according to the file importing instruction;
a second sub-step of receiving a file opening instruction generated by touching the new file or the existing file displayed in the touch screen; and
a third sub-step of launching the selected new file or existing file (i.e. the touched new or existing file) according to the file opening instruction, and correspondingly displaying a first area and a second area corresponding to the selected file.

Step S207: receiving a touch instruction generated on the touch screen, and obtaining touch point coordinates of the touch instruction on the touch screen.

Step S208: determining whether the touch point coordinates of the touch instruction on the touch screen are located within the first area or the second area, where the first area is at least configured for implementing a handwriting input, and the second area is configured for implementing a control.

In step S208, if it is determined that the touch point coordinates are located within the first area, then it goes to Step S209; and if it is determined that the touch point coordinates are located within the second area, then it directly goes to Step S211.

Step S209: determining whether the touch instruction is a capacitive induction instruction or an electromagnetic induction instruction.

In Step S209, if it is determined that the touch instruction is the electromagnetic induction instruction, then it goes to Step S210; and if it is determined that the touch instruction is the capacitive induction instruction, then it goes to Step S211.

Step S210: processing the touch instruction according to a handwriting input mode. Specifically, processing the touch instruction according to a handwriting input mode includes: converting the touch instruction into a handwriting trace displayed in the first area according to the handwriting input mode, and recording the handwriting trace.

Step S211: processing the touch instruction according to a touch control mode.

Specifically, there are two cases below:
(1) in the first case where Step S211 follows Step S208, i.e. it is determined that the touch point coordinates are located within the second area, the electromagnetic induction instruction or the capacitive induction instruction is processed according to the touch control mode. Here, the capacitive induction instruction or the electromagnetic induction instruction is used as a control instruction, to trigger the function of the control instruction corresponding to the widget displayed within the second area; and
(2) in the second case where Step S211 follows Step S209, i.e. it is determined in Step S208 that the touch point coordinates are located within the first area and it is determined in Step S209 that the touch instruction is a capacitive induction instruction, the capacitive induction instruction is processed according to the touch control mode, i.e. the control operation corresponding to the capacitive induction instruction is identified and responded.

Further, for the second case, if it is determined in Step S208 that the touch point coordinates are located within the first area, then processing the touch instruction according to the touch control mode in Step S211 further includes several cases below:

specifically:

the capacitive induction instruction may be of a handwriting input type or a handwriting control type. The capacitive induction instruction of the handwriting input type is mainly configured for presenting the handwriting trace inputted by the user, and the capacitive induction instruction of the handwriting control type is mainly configured for other control operations such as page turning, font zooming and font drag-and-drop.

Figure 7:
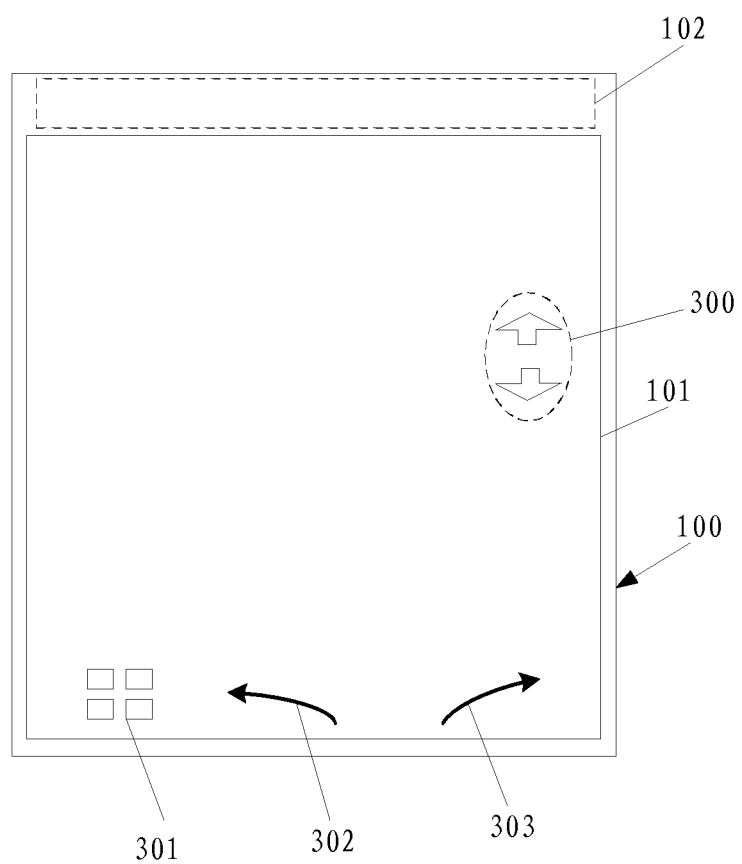
FIG. 7 is a schematic diagram showing the structure of a further application interface of the third implementation of the touch method of the capacitive and electromagnetic dual-mode touch screen according to the present disclosure.

If the capacitive induction instruction is of the handwriting control type:

the widget is displayed in the first area according to the touch control mode, and the function of the touch instruction corresponding to the widget is triggered. As shown in the FIG. 7, a plurality of widgets, i.e. a scrolling and page turning widget 300, a function key widget 301, a previous page widget 302 and a next page widget 303, are displayed in a first area 101 in FIG. 7. The function of the widget can be triggered by touching the widget. Or, the function of the touch instruction is directly triggered without displaying the widget in the first area, according to the touch control mode. For example, still referring to FIG. 7, no widget is displayed within the first area 101, and then the control instruction and the function of the control instruction may be defined in the first area 101. For example, if the capacitive induction instruction is a page scrolling instruction, then a page scrolling operation is performed according to the page scrolling instruction; if the capacitive induction instruction is a zooming instruction, then a page zooming operation is performed according to the zooming instruction; and if the capacitive induction instruction is a character drag-and-drop instruction, then a character drag-and-drop operation is performed according to the character drag-and-drop instruction. As such, the corresponding operations may be achieved according to the control instruction and the function of the control instruction defined within the first area 101 even if no widget is displayed in the first area 101.

If the capacitive induction instruction is of the handwriting input type:

The widget is not displayed in the first area nor any function is triggered according to the touch control mode, i.e. the capacitive induction instruction of the handwriting input type is not processed. Particularly, the handwriting trace inputted by the user is not presented so as to avoid conflict with a handwriting input function of the electromagnetic induction instruction.

In an implementation of the present disclosure, the handwriting application may include a notebook sub-application, a draft sub-application, a hand painting sub-application and the like, and the plurality of above sub-applications are integrated into a handwriting application so as to enable a handwriting application function to be more compact and unified, and is more convenient for the user in use. Moreover, in the implementation of the present disclosure, in a sub-application, a new file can be created, or an existing file (in particular the function thereof) may be imported from another storage location, which can facilitate the search for the same type of files by the user, simplify user operations and improve office efficiency.

Figure 8:
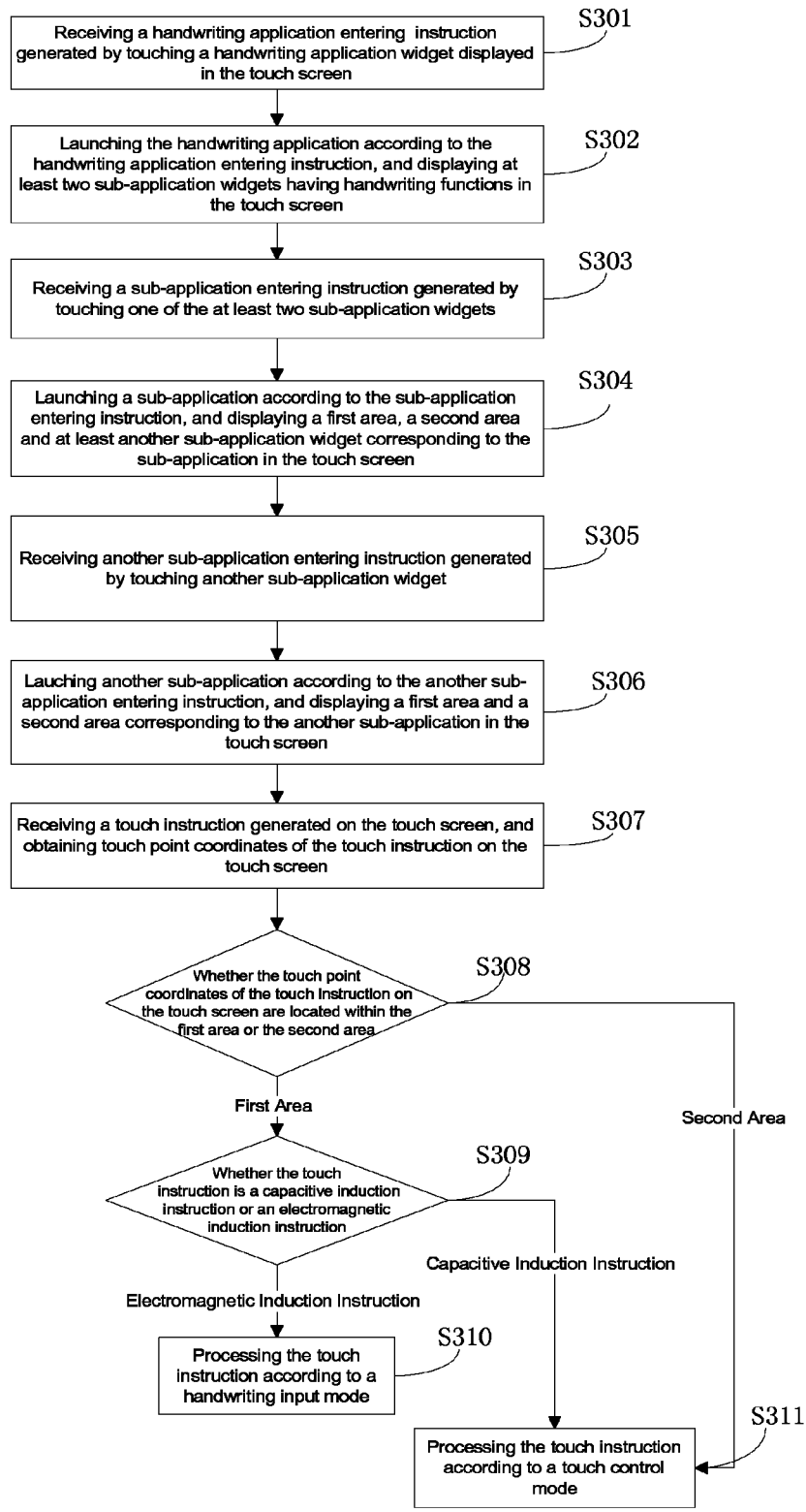
FIG. 8 is a flow chart of a fourth implementation of the touch method of the capacitive and electromagnetic dual-mode touch screen according to the present disclosure.

FIG. 8 is a flow chart of a fourth implementation of a touch method of a capacitive and electromagnetic dual-mode touch screen according to the present disclosure. In the fourth implementation of the present disclosure, the method includes Steps S301 to S311 below.

Step S301: receiving a handwriting application entering instruction generated by touching a handwriting application widget displayed in the touch screen, where, the handwriting application integrates sub-applications having handwriting functions.

Step S302: launching the handwriting application according to the handwriting application entering instruction, and displaying at least two sub-application widgets having handwriting functions in the touch screen.

Step S303: receiving a sub-application entering instruction generated by touching one of the at least two sub-application widgets.

Step S304: launching a sub-application according to the sub-application entering instruction, and displaying a first area, a second area and at least another sub-application widget corresponding to the sub-application in the touch screen.

Step S305: receiving another sub-application entering instruction generated by touching another sub-application widget.

Step S306: launching another sub-application according to the another sub-application entering instruction, and displaying a first area and a second area corresponding to the another sub-application in the touch screen.

Step S307: receiving a touch instruction generated on the touch screen, and obtaining touch point coordinates of the touch instruction on the touch screen.

Step S308: determining whether the touch point coordinates of the touch instruction on the touch screen are located within the first area or the second area, where the first area is at least configured for implementing a handwriting input, and the second area is configured for implementing a control.

In step S308, if it is determined that the touch point coordinates are located within the first area, then it goes to Step S309; and if it is determined that the touch point coordinates are located within the second area, then directly it goes to Step S311.

Step S309: determining whether the touch instruction is a capacitive induction instruction or an electromagnetic induction instruction.

In Step S309, if it is determined that the touch instruction is an electromagnetic induction instruction, then it goes to Step S310; and if it is determined that the touch instruction is a capacitive induction instruction, then it goes to Step S311.

Step S310: processing the touch instruction according to a handwriting input mode. Particularly, the processing the touch instruction according to the handwriting input mode includes: converting the touch instruction into a handwriting trace displayed in the first area according to the handwriting input mode, and recording the handwriting trace.

Step S311: processing the touch instruction according to a touch control mode.

In an implementation of the present disclosure, when the user needs to enter from one sub-application to the another sub-application, merely an icon of the another sub-application needs to be clicked for the switching, without quitting the handwriting application integrating a plurality of sub-applications, which can greatly improve office efficiency and experiences of the user.

Figure 9:
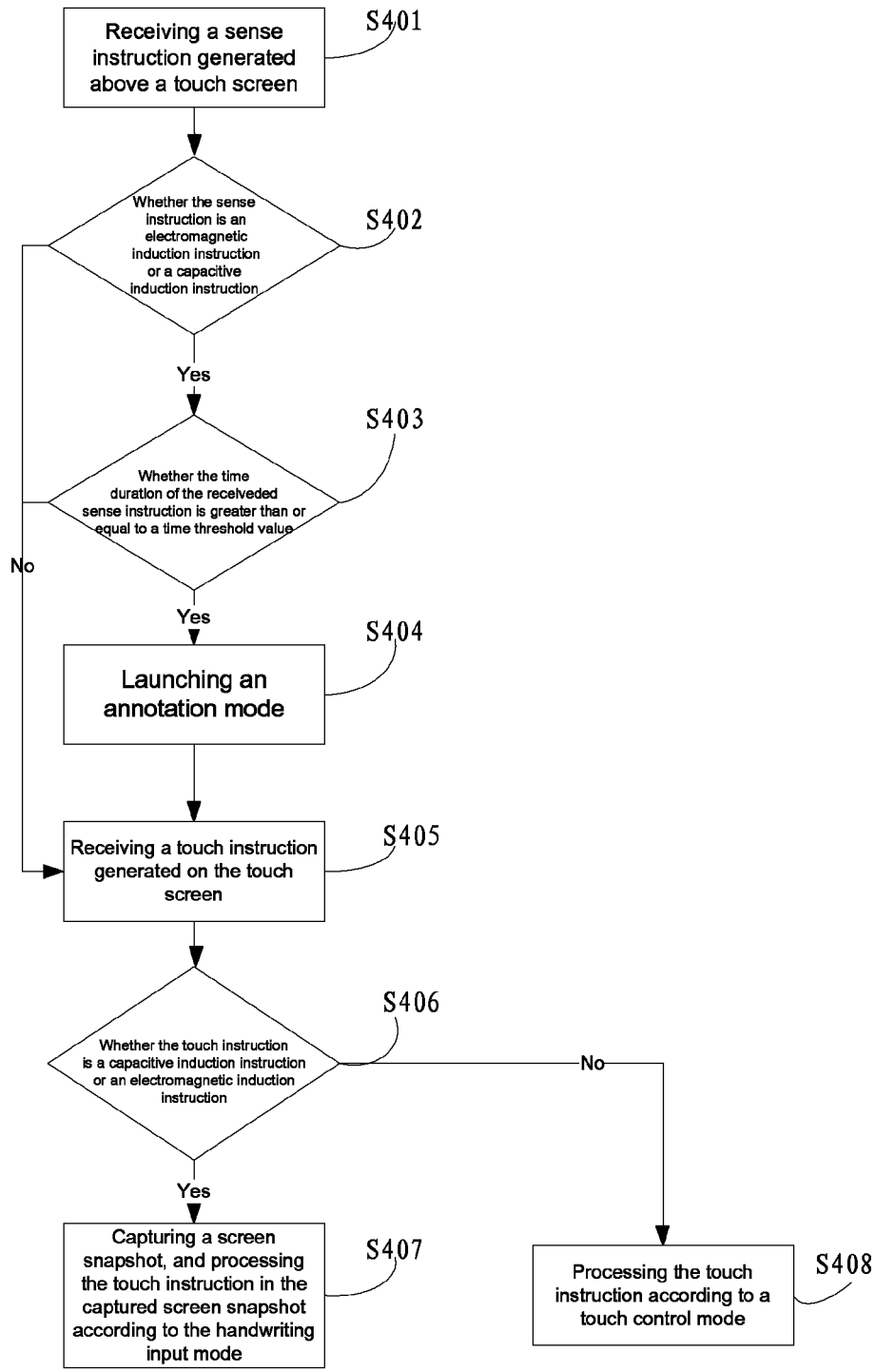
FIG. 9 is a flow chart of fifth implementation of the touch method of the capacitive and electromagnetic dual-mode touch screen according to the present disclosure.

FIG. 9 is a flow chart of a fifth implementation of a touch method of a capacitive and electromagnetic dual-mode touch screen according to the present disclosure. In the fifth implementation of the present disclosure, the method includes Steps S401 to S408 below.

Step S401: receiving a sense instruction generated above a touch screen, where the sense instruction, which is different from the above touch instruction, is generated when a hand or an electromagnetic pen suspends above the touch screen.

Step S402: determining whether the sense instruction is an electromagnetic induction instruction or a capacitive induction instruction.

If it is determined that the sense instruction is an electromagnetic induction instruction, it goes to step S403; otherwise, it goes to step S405.

Step S403: determining whether the time duration of the received sense instruction is greater than or equal to a time threshold value.

The duration time of the received sense instruction refers to a time period during which the electromagnetic pen suspends above the touch screen and is detectable by the dual-mode touch screen. The time threshold value may be set as 1 second, 2 seconds and so on, and may also be set according to specific requirements, which is not limited herein.

If it is determined that the duration time of the sense instruction is greater than or equal to the time threshold value, it goes to step S404; otherwise, it goes to step S405.

Step S404: launching an annotation mode.

Step S405: receiving a touch instruction generated on the touch screen.

Step S406: determining whether the touch instruction is a capacitive induction instruction or an electromagnetic induction instruction.

If it is determined that the touch instruction is the electromagnetic induction instruction, it goes to step S407; otherwise, it goes to step S408.

Step S407: capturing a screen snapshot, and processing the touch instruction in the captured screen snapshot according to the handwriting input mode.

Processing the touch instruction in the captured screen snapshot according to the handwriting input mode includes a handwritten annotation function. The captured screen snapshot may be a picture on which functions such as annotation and remarks can be achieved, which can meet user requirements for presenting original handwriting traces, and meet requirements for simple and convenient operations.

The captured screen snapshot herein may be any display interface such as an original display interface shown when a handheld electronic device is turned on, or may be a display interface shown when entering a certain sub-application program, both of which better achieve the annotation function presented by original handwriting traces.

Step S408: processing the touch instruction according to a touch control mode.

In an implementation of the present disclosure, the annotation mode is launched if it is determined that the sense instruction generated above the touch screen is an electromagnetic induction instruction and the time duration of the electromagnetic induction instruction is greater than or equal to the time threshold value. In the annotation mode, the original handwriting trace of the user can be presented easily and conveniently without additionally defining or setting buttons.

Figure 10:
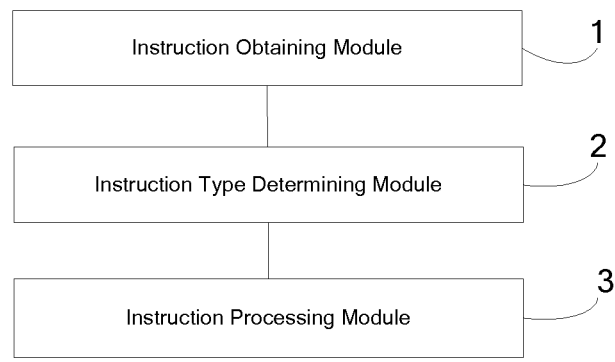
FIG. 10 is a schematic diagram showing the structure of a first implementation of the handheld electronic device according to the present disclosure.

FIG. 10 is a schematic diagram showing a structure of a first implementation of the handheld electronic device according to the present disclosure. The first implementation of the handheld electronic device according to the present disclosure includes: an instruction obtaining module 1, an instruction type determining module 2 and an instruction processing module 3.

The instruction obtaining module 1 is configured to receive a touch instruction generated on the touch screen, and transmit the received touch instruction to the instruction type determining module 2.

The instruction type determining module 2 is configured to receive the touch instruction transmitted by the instruction obtaining module 1, determine whether the touch instruction is a capacitive induction instruction or an electromagnetic induction instruction, and transmit a determination result and the touch instruction to the instruction processing module 3.

The instruction processing module 3 is configured to receive the determination result and the touch instruction transmitted by the instruction type determining module 2. The instruction processing module 3 processes the touch instruction according to a handwriting input mode if the instruction type determining module 2 determines that the touch instruction is an electromagnetic induction instruction; and the instruction processing module 3 processes the touch instruction according to a touch control mode if the instruction type determining module 2 determines that the touch instruction is a capacitive induction instruction.

In an implementation of the present disclosure, it is determined whether the touch instruction is a capacitive induction instruction or an electromagnetic induction instruction. If the touch instruction is the electromagnetic induction instruction, the touch instruction is processed according to a handwriting input mode; and if the touch instruction is the capacitive induction instruction, the touch instruction is processed according to a touch control mode. Process of the touch instruction according to the handwriting input mode can meet user requirements for presenting original handwriting traces, can achieve an original handwriting effect such as stylized trace and higher pressure at a last point of a stroke, and can meet application requirements such as signing and hand painting very well. Moreover, process of the touch instruction according to the touch control mode more conforms to the common habit, such as page-turning with fingers, of a user, can meet requirements for simple and convenient operations, and enhance user experiences.

Figure 11:
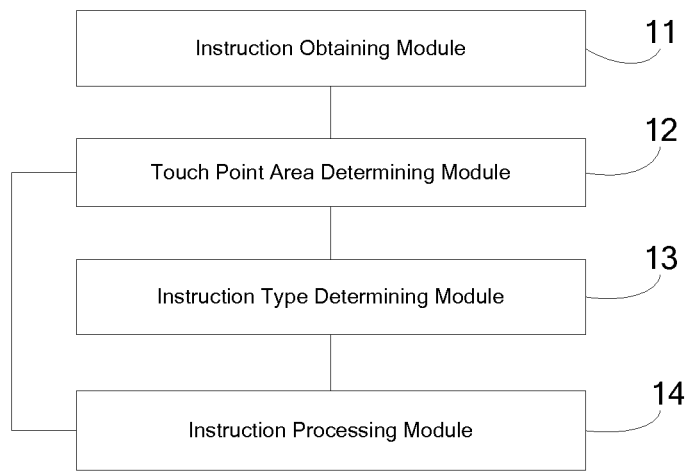
FIG. 11 is a schematic diagram showing the structure of a second implementation of the handheld electronic device according to the present disclosure.

FIG. 11 is a schematic diagram showing a structure of a second implementation of the handheld electronic device according to the present disclosure. The second implementation of the handheld electronic device according to the present disclosure includes an instruction obtaining module 11, an instruction type determining module 13 and an instruction processing module 14, respectively having the same or similar functions and structures with those in the first implementation of the handheld electronic device. In addition, the second implementation of the handheld electronic device according to the present disclosure further includes a touch point area determining module 12.

The instruction obtaining module 11 is configured to receive a touch instruction generated on the touch screen and also obtain touch point coordinates of the touch instruction on the touch screen, and transmit the touch point coordinates and the received touch instruction to the touch point area determining module 12.

The touch point area determining module 12 is configured to receive the touch instruction and the touch point coordinates transmitted by the instruction obtaining module 11, and determine whether the touch point coordinates of the touch instruction on the touch screen are located within a first area or a second area, where the first area is at least configured for implementing a handwriting input, and the second area is configured for implementing a touch control.

The touch point area determining module 12 transmits a determination result and the touch instruction to the instruction type determining module 13 if determining that the touch point coordinates are located within the first area. Otherwise, the touch point area determining module 12 directly transmits the touch instruction to the instruction processing module 14 if determining that the touch point coordinates are located within the second area.

The instruction type determining module 13 is configured to receive the determination result and the touch instruction transmitted by the touch point area determining module 12, and determine whether the touch instruction is a capacitive induction instruction or an electromagnetic induction instruction if the touch point area determining module 12 determines that the touch point coordinates are located within the first area. Further, the instruction type determining module 13 is configured to transmit a determination result and the touch instruction to the instruction processing module 14.

The instruction processing module 14 is configured to receive the determination result and the touch instruction transmitted by the instruction type determining module 13, and further process the touch instruction according to a handwriting input mode if the instruction type determining module 13 determines that the touch instruction is an electromagnetic induction instruction, or else process the touch instruction according to a touch control mode based on the type of the capacitive induction instruction if the instruction type determining module 13 determines that the touch instruction is a capacitive induction instruction. Moreover, the instruction processing module 14 further directly receives the touch instruction transmitted by the touch point area determining module 12, and processes the touch instruction according to the touch control mode.

In the implementation of the handheld electronic device according to the present disclosure, it is determined whether the touch point coordinates of the touch instruction on the touch screen are located within the first area or the second area, and then it is determined whether the touch instruction is the capacitive induction instruction or the electromagnetic induction instruction when the touch point coordinates are located within the first area; if the touch instruction is the electromagnetic induction instruction, then the touch instruction is processed according to the handwriting input mode; and if the touch instruction is the capacitive induction instruction, then the touch instruction is processed according to the touch control mode. Process of the touch instruction according to the handwriting input mode can meet user requirements for presenting original handwriting traces. Moreover, process of the touch instruction according to the touch control mode meets requirements for simple and convenient operations, and enhances user experiences.

Figure 12:
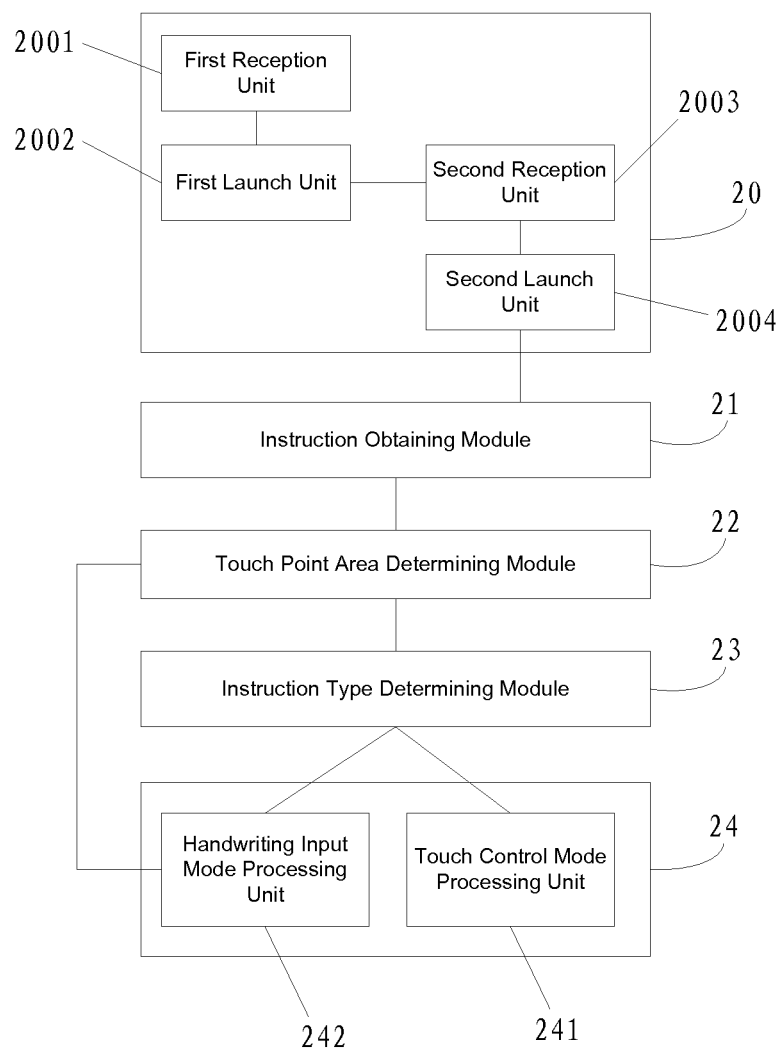
FIG. 12 is a schematic diagram showing the structure of a third implementation of the handheld electronic device according to the present disclosure.

FIG. 12 is a structure schematic diagram of a third implementation of the handheld electronic device according to the present disclosure. The third implementation of the handheld electronic device according to the present disclosure includes an instruction obtaining module 21, a touch point area determining module 22, an instruction type determining module 23 and an instruction processing module 24, respectively having the same or similar functions and structures with those in the second implementation of the handheld electronic device.

In addition, the handheld electronic device further includes an instruction pre-processing module 20, and the instruction pre-processing module 20 includes a first reception unit 2001, a first launch unit 2002, a second reception unit 2003 and a second launch unit 2004.

The first reception unit 2001 is configured for receiving a handwriting application entering instruction generated by touching a handwriting application widget displayed in the touch screen, where the handwriting application integrates all sub-applications having handwriting functions; the first receiving unit 2001 transmits the received handwriting application entering instruction to the first launch unit 2002.

The first launch unit 2002 is configured for receiving the handwriting application entering instruction transmitted by the first reception unit 2001, launching the handwriting application according to the handwriting application entering instruction, and displaying at least two sub-application widgets having handwriting functions in the touch screen.

The second reception unit 2003 is configured for receiving a sub-application entering instruction generated by touching one of the at least two sub-application widgets; and the second reception unit 2003 transmits the sub-application entering instruction to the second launch unit 2004.

The second launch unit 2004 is configured for receiving the sub-application entering instruction transmitted by the second reception unit 2003, launching a sub-application according to the sub-application entering instruction, displaying a first area and a second area corresponding to the sub-application in the touch screen, and transmitting a result to the instruction obtaining module 21.

The second launch unit 2004 is configured for, after launching a sub-application according to the sub-application entering instruction, receiving a file creating instruction or a file importing instruction correspondingly generated by touching a file creating widget or a file importing widget of the sub-application displayed in the touch screen; and creating a new file according to the file creating instruction and opening the new file, and displaying a first area and a second area corresponding to the new file in the touch screen; or importing a selected existing file according to the file importing instruction and opening the existing file, and displaying a first area and a second area corresponding to the existing file in the touch screen.

The instruction processing module 24 is further configured for receiving the determination result and the touch instruction transmitted by the touch point area determining module 22, and processing the touch instruction according to a touch control mode if the touch point area determining module 22 determines that the touch point coordinates are located within the second area. Particularly, if the touch point area determining module 22 determines that the touch point coordinates are located within the second area, the instruction processing module 24 uses the capacitive induction instruction or the electromagnetic induction instruction as a control instruction to trigger the function of control instruction corresponding to the widget displayed within the second area according to the touch control mode.

Further, the instruction processing module 24 includes a handwriting input mode processing unit 241 and a touch control mode processing unit 242, which are both connected to the instruction type determining module 23, and the touch control mode processing unit 242 is further directly connected to the touch point area determining module 22.

The handwriting input mode processing unit 241 is configured for processing the touch instruction according to the handwriting input mode if receiving the determination result that the instruction type determining module 23 determines that the touch instruction is an electromagnetic induction instruction, where processing the touch instruction according to the handwriting input mode includes: converting the touch instruction into a handwriting trace displayed in the first area and recording the handwriting trace.

The touch control mode processing unit 242 is configured for processing the touch instruction according to the touch control mode if receiving the determination result that the instruction type determining module 23 determines that the touch instruction is a capacitive induction instruction, where processing the touch instruction according to the touch control mode specifically includes: displaying the widget in the first area and triggering the function of the touch instruction corresponding to the widget; or, directly triggering the function of the touch instruction without displaying a widget in the first area, according to the touch control mode; or, neither displaying a widget in the first area nor triggering any functions according to the touch control mode. Specific implementation of processing the touch instruction according to the touch control mode may refer to the above description.

In the implementation of the present disclosure, the handwriting application may include a notebook sub-application, a draft sub-application, a hand painting sub-application and the like, and the plurality of sub-applications above are integrated into the same handwriting application so as to enable a handwriting application function to be more compact and unified, and more convenient for the user in use. Moreover, in the implementation of the present disclosure, a new file can be created or an existing file in particular the function thereof may be imported from another storing location in a sub-application, which can facilitate the user to query files of the same type, simplify user operations and improve office efficiency.

Figure 13:
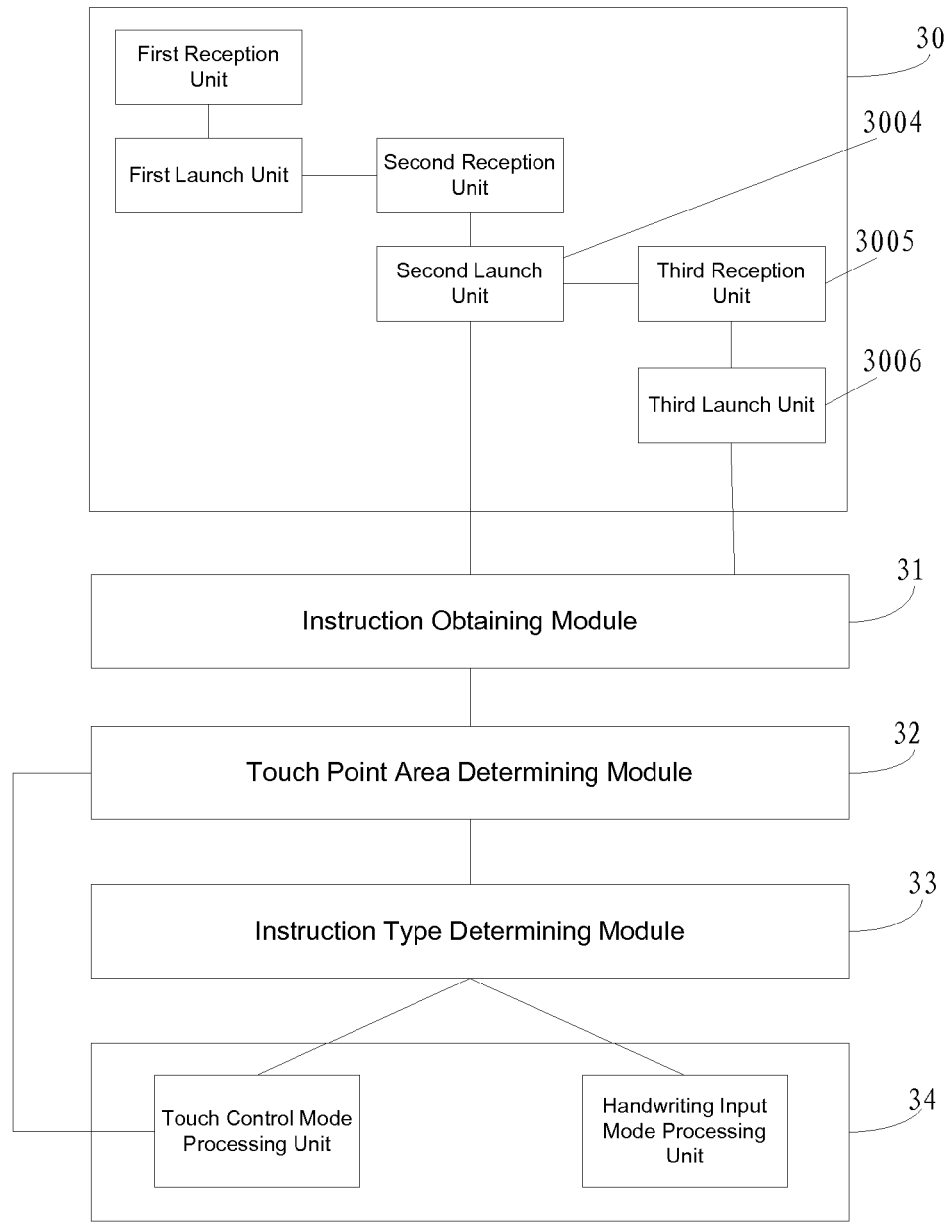
FIG. 13 is a schematic diagram showing the structure of a fourth implementation of the handheld electronic device according to the present disclosure.

FIG. 13 is a schematic diagram showing a structure of a fourth implementation of the handheld electronic device according to the present disclosure. The fourth implementation of the handheld electronic device according to the present disclosure includes an instruction pre-processing module 30, an instruction obtaining module 31, a touch point area determining module 32, an instruction type determining module 33 and an instruction processing module 34, respectively having same or similar functions and structures with those in the third implementation of the handheld electronic device.

A second launch unit 3004 of the instruction pre-processing module 30 may further be configured for launching a sub-application according to a sub-application entering instruction, and displaying a first area and a second area corresponding to the sub-application, and at least another sub-application widget displayed in the touch screen.

Additionally, the instruction pre-processing module 30 further includes:

a third reception unit 3005 configured for receiving an another sub-application entering instruction generated by touching the another sub-application widget; and a third launch unit 3006 configured for launching the another sub-application according to the another sub-application entering instruction, and displaying a first area and a second area corresponding to the another sub-application in the touch screen.

In the implementation of the present disclosure, when the user needs to enter from a sub-application to the another sub-application, merely an icon of the another sub-application needs to be clicked for the switching without quitting the handwriting application integrating a plurality of sub-applications, which can greatly improve office efficiency and experiences of the user.

In above implementations, the first area may be divided into an input area and a display area, where a touch sensing input may be further achieved in the input area by using a soft keyboard interface. In this case, both a finger and an electromagnetic pen can be identified and responded when touching the touch screen, and the diversity of user inputting modes may be increased by using such structural design.

Figure 14:
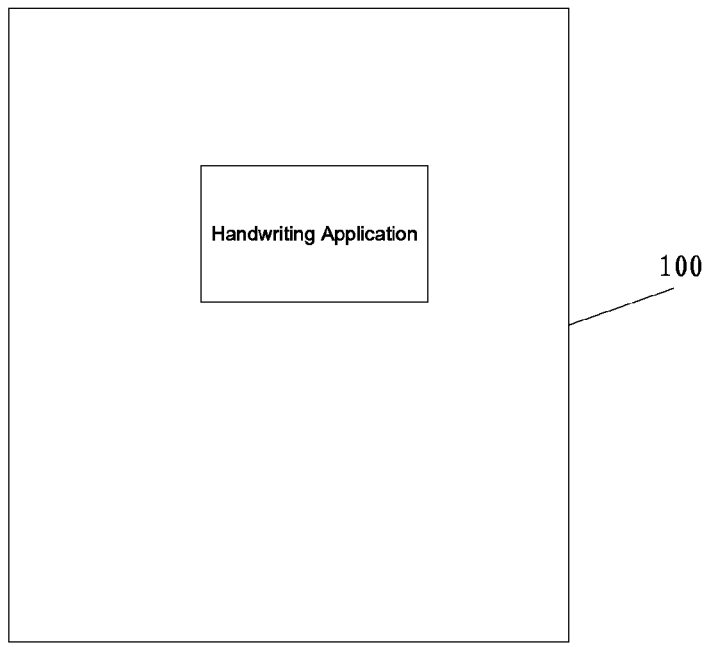
FIGS. 14 to 16 are schematic diagrams showing the structure of an application interface in implementations of the touch method of the capacitive and electromagnetic dual-mode touch screen according to the present disclosure.
Figure 15:
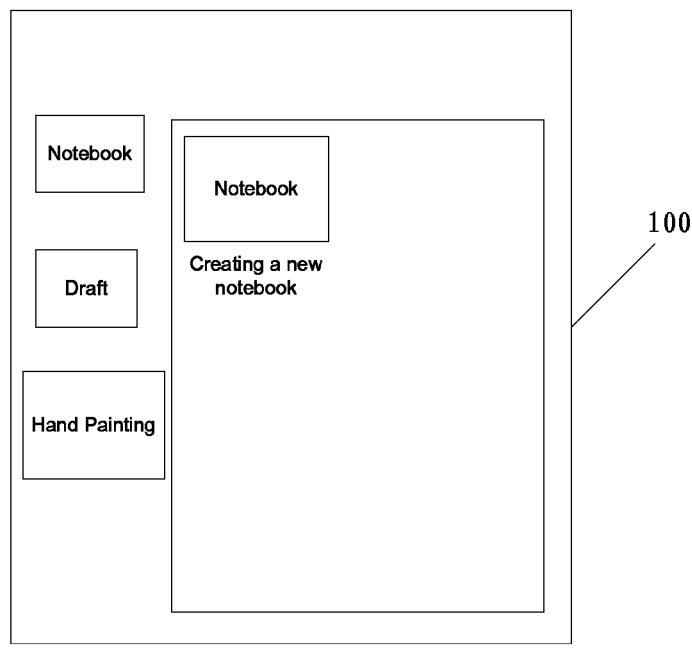
Figure 16:
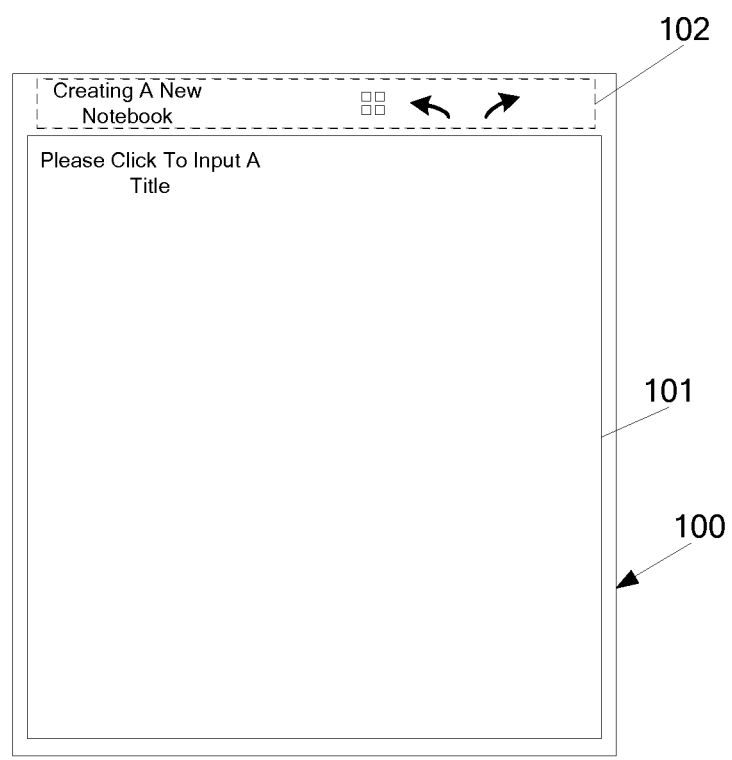

FIGS. 14 to 16 are schematic diagrams showing structures of application interfaces in implementations of the touch method of the capacitive and electromagnetic dual-mode touch screen according to the present disclosure, and are described briefly in the following.

In FIG. 14, a handwriting application is displayed in the center of a touch screen 100, which provides a unified program entrance for a user, and the user enters an interface as shown in FIG. 15 by touching the handwriting application with a finger or an electromagnetic pen.

In FIG. 15, a notebook sub-application, a draft sub-application and a hand painting sub-application are integrated in the handwriting application, with the types of which are not limited to the above three types of sub-applications. Still referring to FIG. 15, if the user touches the notebook sub-application with a finger or an electromagnetic pen, a display interface would be presented on the right side of the touch screen 100, and displays files included in the notebook sub-application, such as a "creating a new notebook" file as shown in FIG. 15. If the user touches the "creating a new notebook" file with a finger or an electromagnetic pen, it goes to an interface as shown in FIG. 16.

In FIG. 16, two areas, i.e. a first area 101 and a second area 102, are displayed in the touch screen 100. In briefly, the first area 101 is a handwriting input area, which is configured for identifying and responding the handwriting input from an electromagnetic pen or a control operation from a finger. The second area 102 is generally a widget area, which is configured for identifying and responding control operations from an electromagnetic pen or a finger. The first area 101 and the second area 102 operate as the above-mentioned manner, which is not repeatedly discussed again herein.

In short, the touch method of a capacitive and electromagnetic dual-mode touch screen and the handheld electronic device according to the present disclosure have following advantage:

(1) by using such a manner of employing both a finger and an electromagnetic pen, an electromagnetic pen is used when writing in the first area, so that vivid writing handwriting of the user may be embodied, and a finger is used to operate when performing other operations in the first area so as to be convenient and efficient;

(2) a plurality of sub-applications having same or similar functions are integrated into one handwriting application, therefore the functions are compact and unified, and office efficiency of the user can be improved;

(3) in the sub-application, a new file may be newly established or an file having a file type supported by the sub-application may be imported from another storing location so as to be convenient for managing, and office efficiency of the user can be improved.

The above descriptions are merely implementations of the present disclosure and hence the patent scope of the present disclosure is not limited thereto, and any equivalent structure changes or equivalent flow changes made by using contents of description and accompanying drawings of the present disclosure, or used directly or indirectly in other relevant technical fields are similarly included within the patent protection scope of the present disclosure.

The invention is:

1. A touch method of a capacitive and electromagnetic dual-mode touch screen, comprising:
receiving a handwriting application entering instruction generated by touching a handwriting application widget displayed in the touch screen;
launching a handwriting application according to the handwriting application entering instruction, wherein the handwriting application integrates all sub-applications having handwriting functions; and displaying at least two sub-application widgets having handwriting functions in the touch screen;
receiving a sub-application entering instruction generated by touching one of the at least two sub-application widgets;
launching a sub-application according to the sub-application entering instruction, and displaying a first area and a second area corresponding to the sub-application in the touch screen, wherein the first area is at least configured for implementing a handwriting input, and the second area is configured for implementing a control;
receiving a touch instruction generated on the touch screen;
obtaining touch point coordinates of the touch instruction on the touch screen;
determining whether the touch point coordinates of the touch instruction on the touch screen are located within the first area or the second area; and
determining whether the touch instruction is a capacitive induction instruction or an electromagnetic induction instruction if it is determined that the touch point coordinates are located within the first area; processing the touch instruction according to a handwriting input mode if the touch instruction is an electromagnetic induction instruction, or else processing the touch instruction according to a touch control mode if the touch instruction is a capacitive induction instruction; and processing the touch instruction according to the touch control mode if it is determined that the touch point coordinates are located within the second area.

2. The touch method according to claim 1, wherein,
the processing the touch instruction according to a handwriting input mode comprises:
converting the touch instruction into a handwriting trace displayed in the first area according to the handwriting input mode, and recording the handwriting trace.

3. A touch method of a capacitive and electromagnetic dual-mode touch screen, comprising:
receiving a touch instruction generated on the touch screen;
obtaining touch point coordinates of the touch instruction on the touch screen;
determining whether the touch point coordinates of the touch instruction on the touch screen are located within a first area or a second area, wherein the first area is at least configured for implementing a handwriting input, and the second area is configured for implementing a control;
if it is determined that the touch point coordinates are located within the first area, determining whether the touch instruction is a capacitive induction instruction or an electromagnetic induction instruction; and
processing the touch instruction according to a handwriting input mode if the touch instruction is an electromagnetic induction instruction, else processing the touch instruction according to a touch control mode if the touch instruction is a capacitive induction instruction.

4. The touch method according to claim 3, wherein,
after determining whether the touch point coordinates of the touch instruction on the touch screen are located within a first area or a second area, the method further comprises:
processing the touch instruction according to the touch control mode if it is determined that the touch point coordinates are located within the second area.

5. The touch method according to claim 4, wherein,
the processing the touch instruction according to a handwriting input mode comprises:
converting the touch instruction into a handwriting trace displayed in the first area according to the handwriting input mode, and recording the handwriting trace.

6. The touch method according to claim 4, wherein,
the processing the touch instruction according to a touch control mode if the touch instruction is a capacitive induction instruction comprises:
displaying a widget in the first area and triggering the function of the touch instruction corresponding to the widget according to the touch control mode; or, directly triggering the function of the touch instruction without displaying a widget in the first area according to the touch control mode; or, neither displaying a widget in the first area nor triggering any functions according to the touch control mode, if the touch instruction is a capacitive induction instruction.

7. The touch method according to claim 4, wherein,
the processing the touch instruction according to the touch control mode if it is determined that the touch point coordinates are located within the second area comprises:
using the capacitive induction instruction or the electromagnetic induction instruction as a control instruction to trigger the function of the control instruction corresponding to a widget which is displayed in the second area, according to the touch control mode, if it is determined that the touch point coordinates are located within the second area.

8. The touch method according to claim3, wherein,
before receiving a touch instruction generated on the touch screen, the method further comprises:
receiving a handwriting application entering instruction generated by touching a handwriting application widget displayed in the touch screen;
launching a handwriting application according to the handwriting application entering instruction, wherein the handwriting application integrates all sub-applications having handwriting functions; and displaying at least two sub-application widgets having handwriting functions in the touch screen;
receiving a sub-application entering instruction generated by touching one of the at least two sub-application widgets; and
launching a sub-application according to the sub-application entering instruction, and displaying a first area and a second area corresponding to the sub-application in the touch screen.

9. The touch method according to claim 8, wherein,
after launching a sub-application according to the sub-application entering instruction, the method further comprises:
receiving a file creating instruction or a file importing instruction correspondingly generated by touching a file creating widget or a file importing widget of a sub-application displayed in the touch screen; and creating a new file according to the file creating instruction and opening the new file, and displaying a first area and a second area corresponding to the new file in the touch screen; or importing a selected existing file according to the file importing instruction and opening the existing file, and displaying a first area and a second area corresponding to the existing file in the touch screen.

10. The touch method according to claim 8, wherein, the launching a sub-application according to the sub-application entering instruction and displaying a first area and a second area corresponding to the sub-application in the touch screen comprises:

launching a sub-application according to the sub-application entering instruction, and displaying a first area, a second area and at least another sub-application widget corresponding to the sub-application in the touch screen;

and after launching a sub-application according to the sub-application entering instruction and displaying a first area and a second area corresponding to the sub-application in the touch screen, the method comprises:

receiving another sub-application entering instruction generated by touching the another sub-application widget; and launching the another sub-application according to the another sub-application entering instruction, and displaying a first area and a second area corresponding to the another sub-application in the touch screen.

11. The touch method according to claim 3, wherein, before receiving a touch instruction generated on the touch screen, the touch method comprises:

receiving a sense instruction generated when suspending above the touch screen;

determining whether the sense instruction is an electromagnetic induction instruction or a capacitive induction instruction;

determining whether time duration of the received sense instruction is greater than or equal to a time threshold value if the sense instruction is an electromagnetic induction instruction;

launching an annotation mode if the duration time is greater than or equal to the time threshold value;

receiving a touch instruction generated on the touch screen;

determining whether the touch instruction is a capacitive induction instruction or an electromagnetic induction instruction; and processing the touch instruction according to a handwriting input mode if the touch instruction is an electromagnetic induction instruction; or else processing the touch instruction according to a touch control mode if the touch instruction is a capacitive induction instruction.

12. The touch method according to claim 11, wherein, a screen is captured, and the touch instruction is processed in the captured screen according to the handwriting input mode so as to perform annotation, if it is determined that the touch instruction is an electromagnetic induction instruction in the step of determining whether the touch instruction is a capacitive induction instruction or an electromagnetic induction instruction.

13. A handheld electronic device having a capacitive and electromagnetic dual-mode touch screen, comprising: at least one processor; and a memory communicably connected with the at least one processor for storing instructions executable by the at least one processor, wherein execution of the instructions by the at least one processor causes the at least one processor to:

receive a touch instruction generated on the touch screen;

obtain touch point coordinates of the touch instruction on the touch screen;

determine whether the touch point coordinates of the touch instruction on the touch screen are located within a first area or a second area, wherein the first area is at least configured for implementing a handwriting input, and the second area is configured for implementing a control;

if it is determined that the touch point coordinates are located within the first area, determine whether the touch instruction is a capacitive induction instruction or an electromagnetic induction instruction; and process the touch instruction according to a handwriting input mode when determining that the touch instruction is an electromagnetic induction instruction, and process the touch instruction according to a touch control mode when determining that the touch instruction is a capacitive induction instruction.

14. The handheld electronic device according to claim 13, wherein, execution of the instructions by the at least one processor further causes the at least one processor to:

process the touch instruction according to the touch control mode if it is determined that the touch point coordinates are located within the second area.

15. The handheld electronic device according to claim 14, wherein, to process the touch instruction according to a handwriting input mode, execution of the instructions by the at least one processor further causes the at least one processor to convert the touch instruction into a handwriting trace displayed in the first area and record the handwriting trace.

16. The handheld electronic device according to claim 14, wherein, to process the touch instruction according to a touch control mode, execution of the instructions by the at least one processor further causes the at least one processor to display a widget in the first area and trigger functions of the touch instruction corresponding to the widget; or, directly trigger functions of the touch instruction without displaying a widget in the first area; or, neither display a widget in the first area nor trigger any functions.

17. The handheld electronic device according to claim 14, wherein, execution of the instructions by the at least one processor further causes the at least one processor to use the capacitive induction instruction or the electromagnetic induction instruction as a control instruction to trigger the function of the control instruction corresponding to the widget which is displayed in the second area, according to the touch control mode, if it is determined that the touch point coordinates are located within the second area.

18. The handheld electronic device according to claim 13, wherein, execution of the instructions by the at least one processor further causes the at least one processor to: receive a handwriting application entering instruction generated by touching a handwriting application widget displayed in the touch screen, wherein the handwriting application integrates all sub-applications having handwriting functions; launch the handwriting application according to the handwriting application entering instruction, and displaying at least two sub-application widgets having handwriting functions in the touch screen; receive a sub-application entering instruction generated by touching one of the at least two sub-application widgets; and launch a sub-application according to the sub-application entering instruction, and displaying a first area and a second area corresponding to the sub-application in the touch screen.

* * * * *